Inventor
WILLIAM H. SLAVIK

BY Mueller, Aichele & Rauner

ATTYS.

Inventor
WILLIAM H. SLAVIK
BY Mueller, Aichele & Rauner
ATTYS.

3,502,800

AUTOMATIC GAIN CONTROL CIRCUIT FOR CONTROLLING THE AMPLITUDE OF SUB-CARRIER OSCILLATOR SIGNALS

William H. Slavik, Oak Lawn, Ill., assignor to Motorola, Inc., Franklin Park, Ill., a corporation of Illinois Filed Oct. 25, 1967, Ser. No. 677,913
Int. Cl. H04n *9/48;* H03b *3/02;* H03g *11/00*
U.S. Cl. 178—5.4 11 Claims

ABSTRACT OF THE DISCLOSURE

The circuit includes a semiconductor device and a detector circuit coupled between the input and output electrodes of the device to automatically control its bias in a manner such that the peaks of an input signal are maintained at a constant value which is below the saturation point of the transistor.

Background of the invention

In communication receivers it is often desirable to convert an oscillatory input signal subject to amplitude variations into a constant amplitude output signal. This is usually accomplished in a limiter circuit which comprises a transistor driven into saturation by the input signal. If the amplitude of the input signal changes, the transistor remains saturated so that the amplitude of the output signal remains substantially constant. When operating at high frequencies, a limiter circuit imposes certain difficulties. Because the transistor is rapidly switched between saturation and cutoff, a variety of high frequency harmonics are created. The transistor when driven into saturation has the effect of a low value resistor which can form a resonant circuit with any reactive components in the limiter circuit to radiate the harmonics. The harmonics may be picked up by the antenna, for example, to introduce spurious signals into the receiver.

In color television receivers the color television signal is composed of a color information signal component modulated on a subcarrier, and a burst signal component synchronized with such subcarrier. In the receiver, the burst signal component is separated from the remainder of the television signal and is used to generate a reference signal. Three phases of the reference signal demodulate the color information signal component along predetermined angles to produce separate video voltages representing red, blue and green. When applied to a tri-gun cathode ray tube, these video voltages reproduce a color image. So as not to produce incorrect hue and saturation of the image, the reference signal must be maintained at a constant amplitude. A hue control usually contained in the reference signal generating means to change the phase of the reference signal undesirably adds amplitude variations to the reference signal. In addition, different channels transmit different amplitudes of the burst signal component which cause particularly noticeable effects in those receivers utilizing the burst signal component directly to generate the reference signal rather than a separate oscillator. If the limiter circuit above described were used to remove these amplitude variations, the harmonics thereby created can be picked up by the antenna of the color television receiver to introduce spurious signals therein.

In color television receivers, the bandpass circuit which translates the color information signal component to the demodulator is disabled in the absence of the burst signal component by the use of a color killer circuit. This is necessary to preclude noise from being applied through the bandpass circuit to the cathode ray tube to degrade a monochrome image. In the past, the color killer has generally comprised one or two additional transistors and associated circuitry to add cost to the overall receiver.

Summary of the invention

It is, therefore, an object of this invention to provide an amplifier circuit which generates a constant amplitude oscillatory signal without producing undesirable harmonics.

Another object is to provide a transistorized amplifier circuit which produces a constant amplitude oscillatory signal without being driven into saturation.

Another object is to provide a constant amplitude reference signal for a color television receiver.

Another object is to provide a simplified, inexpensive color killer circuit for disabling the color bandpass channel in the absence of the burst signal components.

In practicing the amplifier circuit of the invention, an oscillatory signal is applied to the input electrode of a semiconductor device. The signal is subject to have peaks of one polarity exceeding the saturation point of the device and peaks of an opposite polarity exceeding the cutoff point thereof. The output electrode is coupled to a load impedance to produce an output oscillatory signal. A circuit coupled to the load impedance develops a DC operating voltage for the input electrode of the device. The circuit includes means to change the operating voltage as the amplitude of the output oscillatory signal increases in a direction and by an amount to cause the peaks of the input oscillatory signal of said opposite polarity to drive the device further into cutoff and to maintain the peaks of said one polarity at a substantially constant voltage level which is less than the saturation point of the semiconductor device.

The amplifier circuit may be used in a color television receiver to provide a constant output reference signal in which case the input oscillatory signal is either the burst signal component in the color television signal or an oscillatory signal synchronized therewith. Means may be coupled from the detector circuit to the input of the color bandpass amplifier for disabling the same in the absence of the color burst component. Additional means may be coupled from the output of the color bandpass amplifier to the input electrode of the semiconductor device to provide regenerative color killer action in the absence of the color burst component.

Detailed description of the preferred embodiments

Figure 1:
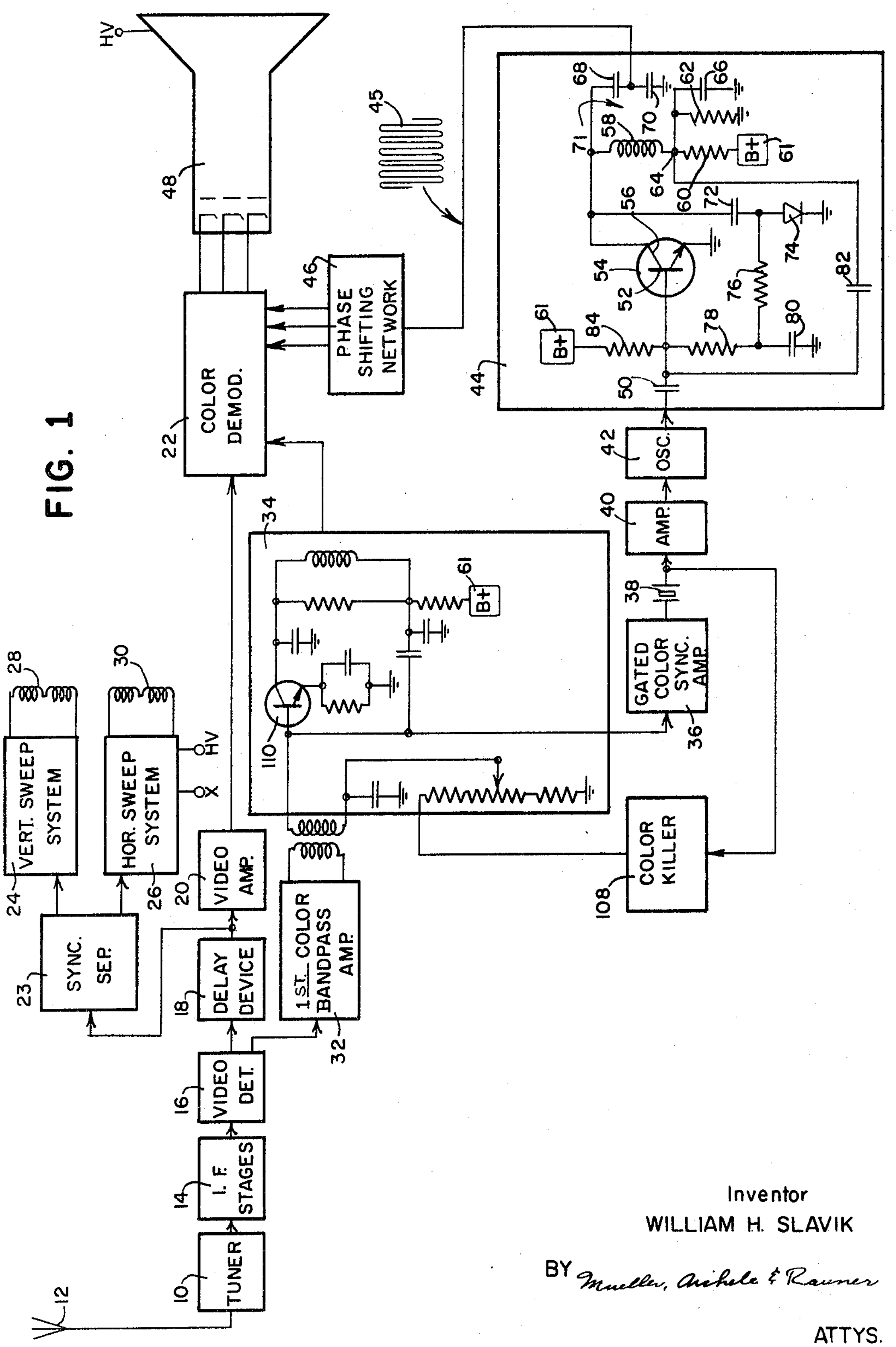
FIG. 1 is a diagram partially in schematic and partially in block of a color television receiver incorporating an amplifier circuit according to the features of the invention.

Referring now to FIG. 1, the color television receiver therein shown includes a tuner 10 to receive and convert incoming television signals appearing at antenna 12. Tuner 10 may include, for example, RF stages of the receiver as well as the first detector or mixer and associated local oscillator. The output intermediate frequency signal developed by tuner 10 is coupled through intermediate frequency (IF) stages 14 to the video detector 16. The brightness components and synchronizing components in the detected composite video signal are delayed in a delay device 18 for purposes well known to those skilled in the art. The brightness components are amplified in video amplifier 20 and applied to the color demodulator 22.

The synchronizing components are separated from the detected composite video signal in synchronizing signal separator circuit 23, and are supplied to the vertical sweep system 24 and the horizontal sweep system 26. The systems respectively develop vertical and horizontal sweep signals in the vertical deflection winding 28 and horizontal deflection winding 30.

The composite color signal including a subcarrier modulated color information signal component, and the burst signal component synchronizing with the subcarrier are translated through a first color bandpass amplifier 32. The color information signal components are coupled through a second color bandpass amplifier 34 and are supplied to the color demodulator 22.

The composite color signal is applied from the input to the second color bandpass amplifier 34 to a gated color sinc amplifier 36. Pulses from horizontal sweep system 26 permit conduction of the sync amplifier 36 during horizontal blanking intervals to translate only the eight or nine cycles of the 3.58 mHz. color burst component which exist during such intervals. The color burst signal component rings crystal 38, is then amplified in amplifier 40 and applied to an oscillator 42 which develops an oscillatory signal at the frequency of the burst signal component. The oscillator signal is further amplified in amplifier 44 to provide a constant amplitude oscillatory reference signal 45 at 3.58 mHz. The phase shifting network 46 develops reference signals each at a different preselected phase for application to the color demodulator 22. The brightness components from video amplifier 20, the color information signal components from second bandpass amplifier 34 and the three phase related reference signals from phase shifting network 46 combine in a particular fashion in color demodulator 22 to produce red, blue and green video voltages, which cause the multi-gun cathode ray tube 48 to produce a color image.

It is known that changes in the amplitude of the oscillatory reference signal 45 will cause the demodulator to produce color video voltages which do not correspond to those in the transmitter and thereby cause the cathode ray tube 48 to produce incorrect colors. It is therefore most desirable that the oscillatory reference signal be maintained as constant as possible. The oscillator 42 generally includes a hue control which changes the phase of the oscillatory reference signal 45 and therefore the phases of each of the signals from the phase shifting networks 46 to adjust the hue of the image. The hue control however does not have ideal characteristics and, therefore, adjustment thereof will cause some amplitude change. In addition, the burst signal component in the composite color signal varies in amplitude from station to station and thus this also will be reflected as a change in the amplitude of the reference oscillatory signal. This latter phenomenon is particularly noticeable where the burst signal component is itself amplified and applied to the phase shifting network 46, as opposed to employing the oscillator 42.

In the past, these amplitude variations have been reduced by using a limiter in place of the amplifier circuit 44. Then, the oscillatory signal arising from either the burst signal component or an oscillator is applied to a transistor and is of sufficient amplitude to saturate the transistor so that a change in its amplitude will merely change the degree of saturation thereby providing a constant amplitude oscillatory reference signal 45. Although this is adequate for producing a constant amplitude signal, it has the decided advantage of producing harmonics which can radiate back into the tuner 10, antenna 12, IF stages 14, video detector 16, etc., to produce spurious signals and therefore inaccurate color images. This is true because a saturated transistor appears as a low value resistor which can form a resonant circuit with any reactive components present in the circuit and because of the fast switching times of the limiter, a wide variety of frequencies can be produced for radiation. Since the limiter produces high amplitude signals, the radiated signals can have a significant adverse affect on the operation of the receiver.

In order to preclude these adverse effects and yet provide a constant amplitude signal, the amplifier circuit 44 is provided. The oscillatory signal from oscillator 42 is applied to a capacitor 50 to the base 52 of an NPN transistor 54, the emitter of which is grounded. The collector 56 is coupled to an output circuit compriesd of an inductor 58 in series with a resistor 60 to a DC potential source 61. The transistor 54 in a practical construction had a 40 volt collector-to-emitter breakdown and because the output signal on collector 56 can be double the supply potential which was 35 volts, such supply potential was divided down by use of a resistor 62 coupled to ground to provide a DC operating potential at junction 64, which is bypassed by capacitor 66. The amount of division was selected to provide a 15 volt operating potential so that the oscillatory reference signal 45 had a peak-to-peak amplitude of 30 volts which was below the voltage breakdown of the transistor. A pair of capacitors 68 and 70 are coupled in series from the collector 56 to ground to form along with the inductor 58 a resonant circuit 71 tuned to 3.58 mHz. The capacitors 68 and 70 also provide matching to the phase shifting network 46.

A detector circuit consisting of a capacitor 72 and a diode 74 are coupled in series from the collector 56 to ground. The junction of capacitor 72 and diode 74 is coupled through a feedback and filtering network comprised of a pair of resistors 76 and 78 coupled in series to the base 52 of transistor 54. A filter capacitor 80 is coupled between the junction of resistors 76 and 78 and ground. A neutralization capacitor 82 is coupled from the junction of resistor 60 and inductor 58 to the base 52. A resistor 84 is coupled from DC potential source 61 to the base 52 and is of a value to quiescently saturate the transistor.

Figures 2, 3:
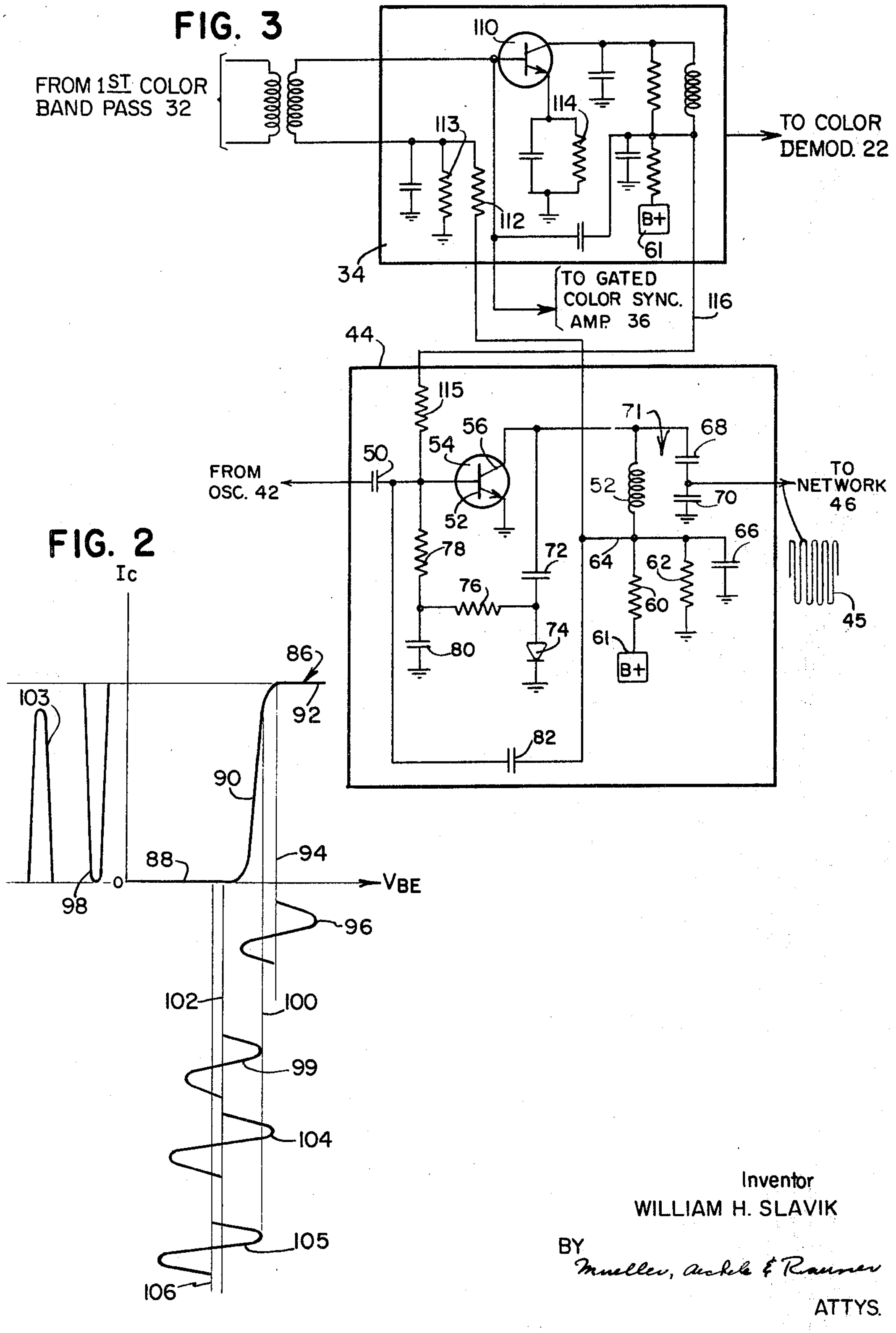
FIG. 2 is a graph of the transfer characteristic of the amplifier circuit of FIG. 1 with various input and output signals.
FIG. 3 illustrates another embodiment of the invention.

The operation of the amplifier circuit 44 may be better explained by referring to FIG. 2 illustrating a typical transistor transfer characteristic 86 which plots the base-emitter voltage ($V_{BE}$) against the collector current ($I_C$). When the base voltage is within range 88, the transistor is cut-off, within range 90 the transistor is conducting and within the range 92 the transistor is in saturation. As will be seen later, it is desirable that the slope of range 90 be steep and that the knees be sharp. As mentioned before, transistor 54 is quiescently biased into saturation, the degree of which will be determined by the value of resistor 84. It will be assumed that the value of resistor 84 is such as to establish the transistor slightly in saturation with a base voltage having a value 94.

Suppose the oscillatory signal 96 from oscillator 42 is impressed on the base 52 in which case, the negative peaks thereof are sufficient to cut off transistor 54 to provide a collector current pulse 98. The resonant circuit 71 is rung by the pulse 98 to form the sinusoidal oscillatory reference signal 45 with a peak-to-peak amplitude proportional to the amplitude of pulse 98. A portion of the signal 45 is half-wave rectified in the detector circuit comprised of capacitor 72 and diode 74 to provide a negative voltage slightly less (due to detector inefficiency) than one-half the peak-to-peak amplitude. This voltage is filtered and fed back to the base 52 of transistor 54 by means of resistors 76 and 78 and capacitor 80, and is of sufficient value to reduce the base voltage well into the cutoff region 88 so that the amplitude of the oscillatory signal 45 instantaneously becomes zero. Now the current from source 61 and through resistor 84 tends to turn the transistor 54 on again which produces a sinusoidal output to be fed back and oppose the current from source 61. An equilibrium state will be reached when the operating base voltage is reduced from value 94 to a selected value 102 to correspondingly reduce to an unsaturated level 100 the voltage at which the positive peaks of the oscillatory signal 96 occur. The result is indicated by reference numeral 99. This will produce a curent pulse 103 which rings resonant circuit 71 to form the reference signal 45 with a peak-to-peak amplitude proportional to the amplitude of pulse 103. This means that the negative peaks of the oscillatory signal will drive the transistor 54 farther into cutoff (note that the negative peaks of signal 99 extend farther into region 88 than do the negative peaks of signal 96). When a transistor is cutoff, no high frequency resonant circuit is created to radiate harmonics.

Suppose an oscillatory signal 104, the amplitude of which is greater than signal 96, is impressed on base 52. The amplitude of signal 45 increases and when such increase is detected and fed back, the operating base voltage is reduced from value 102 to value 106. The decrease will be just sufficient to cause the positive peaks of signal 105 to again reach the same voltage 100 while the negative peaks merely drive the transistor 54 further into cutoff. Accordingly, the current pulse 103 is again produced with the negative-going tips slightly flattened so that the amplitude of the oscillatory reference signal 45 is substantially the same as that produced in response to the lower amplitude signal 96.

The principle of operation, therefore, is as the signal from oscillator 12 increases in amplitude, the DC operating voltage on the input electrode of the transistor 54 is changed in a direction and by an amount to cause the positive peaks to reach the same constant value. In order to accomplish this, the negative peaks drive the transistor farther into cutoff. It should be noted that while the above explanation implies increments of time, the operation actually occurs almost instantaneously.

The amplifier circuit 44 desirably has a snap-actiontype operation. That is, with no oscillatory signal applied to the transistor, the base voltage remains at value 94 and therefore no output is provided. A weak signal will produce some output which is detected and fed back to insure that its positive peaks are at level 100, although the sinusoidal oscillatory reference signal thereby produced may not have exactly the same amplitude as the reference signal produced in response to signals 99 and 105. This characteristic arises from the deviation of the region 90 from a perfect vertical slope. If the slope was vertical, even a very weak amplitude signal would produce full output without going into saturation. But even here it may be seen that the region 90 is rather steep and therefore the transition in which the amplitude of the sinusoidal oscillatory reference signal 45 is changing is very small.

The values of resistors 76 and 78 will determine the amplitude of the signal 45, with the smaller the value of the resistors 76 and 78 the smaller in amplitude the signal will be. This is true because as the resistors are reduced in value, more negative voltage is fed back for a given amplitude of signal 45 to reduce the base voltage for signal 99, for example, from value 102 to some lower value. Accordingly, the positive peaks of signal 99 will reach a voltage less than voltage 100 to thereby reduce the amplitude of the current pulse 103. Of course, the maximum amplitude of signal 45 is limited by the voltage at junction 64. If the feedback is reduced by increasing resistors 76 and 78 for example, to increase the amplitude of signal 45, a point will eventually be reached when the transistor will become saturated in the presence of a signal from oscillator 42.

The filter capacitor 80 is desirably small and in fact may be eliminated to provide rapid response for the amplifier circuit 44 for changes in the amplitude of the oscillator signal from oscillator 42. This is feasible because the oscillatory signal has no lower frequency amplitude modulation to be retained and therefore none to be lost in rapidly changing the bias on transistor 54 to maintain a constant amplitude oscillatory reference signal 45.

It is desirable that resistor 84 be as large as possible and still maintain the transistor 54 quiescently in saturation in order that as much of the change in the amplitude of the signal 45 be reflected on the base 52. As 100% loop gain is approached, the amplitude of signal 45 more ideally approaches constancy for changes in the amplitude of the input oscillatory signal. Of course, the limitation is the value of the voltage from source 61 because the resistor 84 must be small enough to provide sufficient current in the transistor 54 to quiescently saturated it.

The operation just explained depends on making use of the entire transfer characteristic of the transistor 54. That is, no signal from oscillator 42 or a very weak signal therefrom has no effect on the transistors being biased quiescently in saturation. For a range of slightly stronger signals depending on the slope of region 90, the amplitude of the oscillatory reference signal 45 changes. And most important, signals from oscilator 42 having a greater amplitude drive the transistor into varying degrees of cutoff to only slightly affect the amplitude of the output current pulse 103. Again, the oscillatory signal from oscillator 42 has no lower frequency amplitude modulation to be retained and therefore none to be lost by cutting off a portion of the oscillatory input signal.

During monochrome transmission, it is desirable to disable the color channel so that noise and miscellaneous video signals cannot be coupled through the demodulator 22 to the cathode ray tube 48. This may be accomplished by coupling a portion of the signal out of the crystal 38 into a color killer circuit 108 to produce a control voltage which is negative in the absence of the burst signal component, as indicating monochrome transmisison and which is positive in the presence of the burst signal component as indicating a color transmission. This control voltage is applied to the base of the transistor 110 in the second color bandpass amplifier 34. During monochrome transmission, the negative voltage renders the transistor 110 non-conductive to disable the bandpass amplified 34. In order to prevent instability arising from alternate conduction and non-conduction of the tarnsistor 110 in the presence of a weak color signal, the color killer 108 generally comprises a transistorized switch to provide positive action to insure that the transistor 110 is either conductive or non-conductive. This is expensive and therefore undesirable.

The characteristics of the amplifier circuit 44 may be used to advantage in providing an inexpensive color killer circuit. This is shown in FIG. 3 where parts corresponding to those in FIG. 1 are labeled with the same reference numerals. With no burst signal component, it will be remembered that the transistor 54 was in saturation so that the collector 56 is grounded as is the junction 64. The transistor also has a base resistor 113 to ground and an emitter resistor 114 to ground. A resistor 112 couples junction 64 to the base of the transistor 110, and grounds the same during monochrome transmission to render the transistor non-cnoductive and thereby disable the second bandpass amplifier 34. For color transmission, the oscillatory signal from oscillator 42 takes the transistor 54 out of saturation so that it draws substantially less average current and the voltage at junction 64 has a greater positive value which when coupled through reisstor 112 biases transistor 110 into conduction to enable the bandpass amplifier 34. Because of the steep slope of the region 90 of the transfer characteristic 86 of FIG. 2, the range in which the voltage on junction 64 is not zero or some greater positive value is very small. Accordingly, it may be appreciated that there is a snap action between enabling and disabling of the bandpass amplifier 34.

To further enhance the operation, a resistor 115 may be connected from the output circuit of the transistor 110 to the base 52 of the transistor 54. When the bandpass amplifier 34 becomes disabled, transistor 110 ceases to draw current and the voltage on conductor 116 goes positive to establish transistor 54 further into saturation which aids in grounding junction 64 to aid in rendering transistor 110 non-conductive. It will be noted that the input and output electrodes of the transistors 110 and 54 are cross-coupled to provdie a regenerative action which has the effect of steepening the slope of the region 90 and therefore minimizing the possibility of a weak burst signal component causing alternate enabling and disabling of the bandpass amplifier 34.

In a practical embodiment, the oscillatory signal from oscillator 42 had an average peak-to-peak amplitude of .9 volt, and the oscillatory reference signal 45 had an amplitude of 30 volts. Over a wide range in input voltages, the amplitude of signal 45 varied by only a few tenths of a volt. With a 35 volt source, the following component values were used.

Capacitor 50—.001 microfarad
Resistor 60—1,000 ohms
Resistor 62—1,800 ohms
Capacitor 72—22 picofarads
Resistor 76—27K ohms
Resistor 78—22K ohms
Capacitor 80—0.1 microfarad
Resistor 84—180K ohms
Resistor 112—10K ohms
Resistor 113—1,000 ohms
Resistor 114—200 ohms
Resistor 115—100K ohms What has been described, therefore, is an improved amplifier circuit which provides a constant amplitude output sinusoidal signal without producing undesirable harmonics. The circuit is particularly useful in a color amplitude reference signal and provide a snap-action-type color killer signal.

I claim:

1. An amplifier circuit including in combination; semiconductor means having input and output electrodes, first circuit means coupled to said input electrode for supplying an input oscillatory signal thereto subject to have peaks of one polarity exceeding the cutoff point of said semiconductor means and peaks of an opposite polarity undesirably exceeding the saturation point thereof, an output circuit coupled to said output electrode and including a load impedance across which an amplified representation of the oscillatory signal appears, second circuit means coupled between said output circuit and said input electrode for providing a direct current operating potential on said input electrode, said circuit means including means for changing the direct current operating potential for an increase in the amplitude of the amplified representation of the oscillatory signal by an amount and in a direction to cause the peaks of the input oscillatory signal which are of said one polarity to drive the semiconductor means further into cutoff and to cause the peaks thereof which are of said opposite polarity to reach a substantial constant voltage level which is less than the saturation point of said semiconductor means.

2. The amplifier circuit set forth in claim 1 wherein said second circuit means comprises a detector responsive to the amplitude of the amplified representation of the oscillatory signal to change the direct current operating potential, said circuit means further including means coupling the direct current operating potential to said input electrode and having a time constant selected to permit said potential to follow substantially all of the rates at which the amplitude of the input oscillatory signal may vary.

3. The amplifier circuit set forth in claim 2 wherein said detector circuit comprises capacitor means and diode means coupled in series to the output electrode of said semiconductor means, and wherein said means coupling the control operating potential to said input electrode comprises resistor means coupled from the junction of said capacitor means and said diode means to said input electrode.

4. The amplifier circuit set forth in claim 1 wherein said semiconductor means comprises a transistor having a base electrode corresponding to said input electrode, a collector electrode corresponding to said output electrode, and an emitter electrode, wherein said second circuit means comprises a detector circuit coupled across said collector and emitter electrodes to respond to changes in the amplitude of the amplified representation of the oscillatory signal to change the direct current operating potential, wherein said circuit means further comprises coupling circuit means coupled from said detector circuit to said base electrode, said amplifier circuit further including bias circuit means coupled to said base electrode to quiescently saturate said transistor.

5. The amplifier circuit set forth in claim 4 wherein said detector circuit comprises capacitor means and diode means coupled in series across said collector and emitter electrodes, and wherein said coupling circuit means comprises resistor means coupled from the junction of said capacitor means and said diode means to said base electrode.

6. In a color television receiver for a color television signal having a color information signal component modulated on a subcarrier and a burst signal component in synchronized relation to the subcarrier, a color bandpass amplifier for amplifying the color information signal component, a burst separator circuit for deriving the burst signal component from the television signal, first circuit means coupled to the burst separator circuit to provide an input oscillatory signal at the frequency of the burst signal component, a color demodulator circuit responsive to the color information signal component and to the burst signal component for developing color signals, the combination of; semiconductor means having input and output electrodes, means coupling said circuit means to said input electrode, an output circuit including a load impedance across which an amplified representation of the oscillatory signal appears, means coupling said output circuit to the demodulator circuit, the input oscillatory signal having an amplitude subject to change and having peaks subject to exceed the saturation point of said semiconductor means, a detector circuit coupled to said output circuit for developing a control voltage which changes in accordance with the amplitude of the amplified representation of the oscillatory signal, and second circuit means coupling the detector circuit to said input electrode to reduce the bias thereon for an increase in the amplitude of the amplified representation of the oscillatory signal by an amount to insure that the peaks of the input oscillatory signal reach a substantially constant voltage level which is less than the saturation point of said semiconductor means.

7. The color television receiver set forth in claim 6 further including means direct current coupled from said detector circuit to the color bandpass amplifier to disable the amplifier when the input oscillatory signal is less than a predetermined level.

8. The color television receiver set forth in claim 6 wherein the color bandpass amplifier has an input and an output, wherein resistor means is coupled from said output electrode of said semiconductor means to said input of said color bandpass amplifier to disable said amplifier when said input oscillatory signal is less than said predetermined level.

9. The color television receiver set forth in claim 8 wherein circuit means are coupled between the output of the bandpass amplifier and the input electrode of said semiconductor means to reduce amplitude variations of the amplified representation of the oscillatory signal near said predetermined level and to reinforce the disabling effect on the color bandpass amplifier.

10. The color television receiver set forth in claim 6 wherein said semiconductor means comprises a transistor having an input electrode and an output electrode, wherein said detector circuit comprises a capacitor and a diode coupled to said output electrode and wherein said second circuit means comprises resistor means coupled from the junction of said capacitor means and said diode means to said input electrode.

11. The color television receiver set forth in claim 10 wherein said resistor means comprises a pair of resistors coupled in series, werein said second circuit means further includes capacitor means coupled between the junction of said pair of resistors to ground reference potential, the time constant of said resistors and said capacitor means selected to cause the control voltage applied to said input electrode to follow substantially all rates of amplitude variations of the input oscillatory signal.

References Cited

UNITED STATES PATENTS 3,436,470 4/1969 Konkel et al. -------- 178—5.4

ROBERT L. GRIFFIN, Primary Examiner

JOHN C. MARTIN, Assistant Examiner

U.S. Cl. X.R.

307—264; 330—29; 328—175